(12) United States Patent
Michigami (10) Patent No.: US 11,188,633 B2
(45) Date of Patent: Nov. 30, 2021

(54) PASSWORD AUTHENTICATION DEVICE AND ELECTRONIC APPARATUS

(71) Applicant: KYOCERA Document Solutions Inc., Osaka (JP)

(72) Inventor: Toru Michigami, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 230 days.

(21) Appl. No.: 16/445,779

(22) Filed: Jun. 19, 2019

(65) Prior Publication Data

US 2019/0392132 A1 Dec. 26, 2019

(30) Foreign Application Priority Data

Jun. 25, 2018 (JP) .............................. JP2018-119812

(51) Int. Cl.
*G06F 21/36* (2013.01)
*G06F 3/041* (2006.01)
*G06Q 20/10* (2012.01)

(52) U.S. Cl.
CPC .............. *G06F 21/36* (2013.01); *G06F 3/041* (2013.01); *G06Q 20/1085* (2013.01)

(58) Field of Classification Search
CPC ...... G06F 21/36; G06F 3/041; G06Q 20/1085
See application file for complete search history.

(56) References Cited

U.S. PATENT DOCUMENTS

| 10,063,560 | B2 * | 8/2018 | Gordon .............. G06K 9/00885 |
| 10,282,563 | B2 * | 5/2019 | Anderson .............. G06F 3/013 |
| 2009/0328197 | A1 * | 12/2009 | Newell .................... G06F 21/36 726/18 |
| 2015/0208244 | A1 | 7/2015 | Nakao | |

(Continued)

FOREIGN PATENT DOCUMENTS

| EP | 2 306 362 | 4/2011 |
| JP | 2003-67341 | 3/2003 |

OTHER PUBLICATIONS

Manu Kumar, Tal Garfinkel, Dan Boneh, and Terry Winograd. 2007. Reducing shoulder-surfing by using gaze-based password entry. In Proceedings of the 3rd symposium on Usable privacy and security (SOUPS '07). Association for Computing Machinery, New York, NY, USA, 13-19. (Year: 2007).*

(Continued)

*Primary Examiner* — James T Tsai
(74) *Attorney, Agent, or Firm* — Wenderoth, Lind & Ponack, L.L.P.

(57) ABSTRACT

A password authentication device includes a display control unit that displays plurality of input key groups, an input operation unit operated by a user to select a soft key on the display screen to enable the input of a password, a sight line detection sensor that detects the direction of the line of sight of a user who operates the input operation unit, an operation target specifying part that specifies an input key group located at the end of the line of sight of the user among the plurality of input key groups, based on the direction of the (Continued)

line of sight detected by the sight line detection sensor, and a password acquisition part assumes an operation in the input operation unit as an operation for the input key group specified by the operation target specifying part and acquires a password inputted through the input operation unit.

5 Claims, 10 Drawing Sheets

(56) References Cited

U.S. PATENT DOCUMENTS

| | | |
|---|---|---|
| 2017/0123492 A1* | 5/2017 | Marggraff .............. H04N 5/247 |
| 2017/0154177 A1 | 6/2017 | Tsou |
| 2018/0018514 A1* | 1/2018 | Azam ................ G06K 9/00335 |
| 2019/0080061 A1* | 3/2019 | Baek ....................... G06F 21/31 |

OTHER PUBLICATIONS

Mohamed Khamis, et al.. 2016. GazeTouchPass: Multimodal Authentication Using Gaze and Touch on Mobile Devices. In Proceedings of the 2016 CHI Conference Extended Abstracts on Human Factors in Computing Systems(CHI EA 16 (Year: 2016).*

Extended European Search Report dated Nov. 7, 2019 in corresponding European Patent Application No. 19181954.9.

* cited by examiner

PASSWORD AUTHENTICATION DEVICE AND ELECTRONIC APPARATUS

CROSS-REFERENCE TO RELATED APPLICATION

This application is based upon and claims the benefit of priority from Japanese Patent Application No. 2018-119812 filed on Jun. 25, 2018, the entire contents of which are incorporated herein by reference.

BACKGROUND

The technology of the present disclosure relates to a password authentication device and an electronic apparatus.

In general, when using a cash dispenser (CD) or an automatic teller machine (ATM), the input of a password is required in order to perform user authentication. In the input of the password, it is often necessary to input numerals of a plurality of digits using a numeric keypad in which numerals from 0 to 9 are arranged in a matrix form. When the arrangement of the numeric keypad is fixed, there is a problem that a password is likely to be inferred (sensed) by someone else from the movement of the finger or hand of a user (an operator).

In order to solve such a problem, there has been proposed a method of displaying a numeric keypad on a display screen including a touch panel and the like and randomly changing the key arrangement of the numeric keypad at a predetermined timing.

SUMMARY

A password authentication device according to an aspect of the present disclosure includes a display device, a display control unit, an input operation unit, a sight line detection sensor, an operation target specifying part, a password acquisition part, and a password authentication part.

The display device has a display screen. The display control unit causes a plurality of input key groups including a plurality of soft keys for inputting a password for user authentication to be displayed on the display screen. The input operation unit is provided at a different position from the plurality of input key groups, and is operated by a user to select a soft key on the display screen so as to enable the input of a password. The sight line detection sensor detects the direction of the line of sight of the user who operates the input operation unit. The operation target specifying part specifies an input key group located at the end of the line of sight of the user among the plurality of input key groups, based on the direction of the line of sight detected by the sight line detection sensor. The password acquisition part assumes an operation in the input operation unit as an operation for the input key group specified by the operation target specifying part and acquires a password inputted through the input operation unit. The password authentication part authenticates the password acquired by the password acquisition part.

The electronic apparatus according to another aspect of the present disclosure includes the aforementioned password authentication device.

DETAILED DESCRIPTION

Hereinafter, an example of an embodiment will be described in detail on the basis of the drawings. It is noted that the technology of the present disclosure is not limited to the following embodiments.

Embodiment 1

Figure 1:
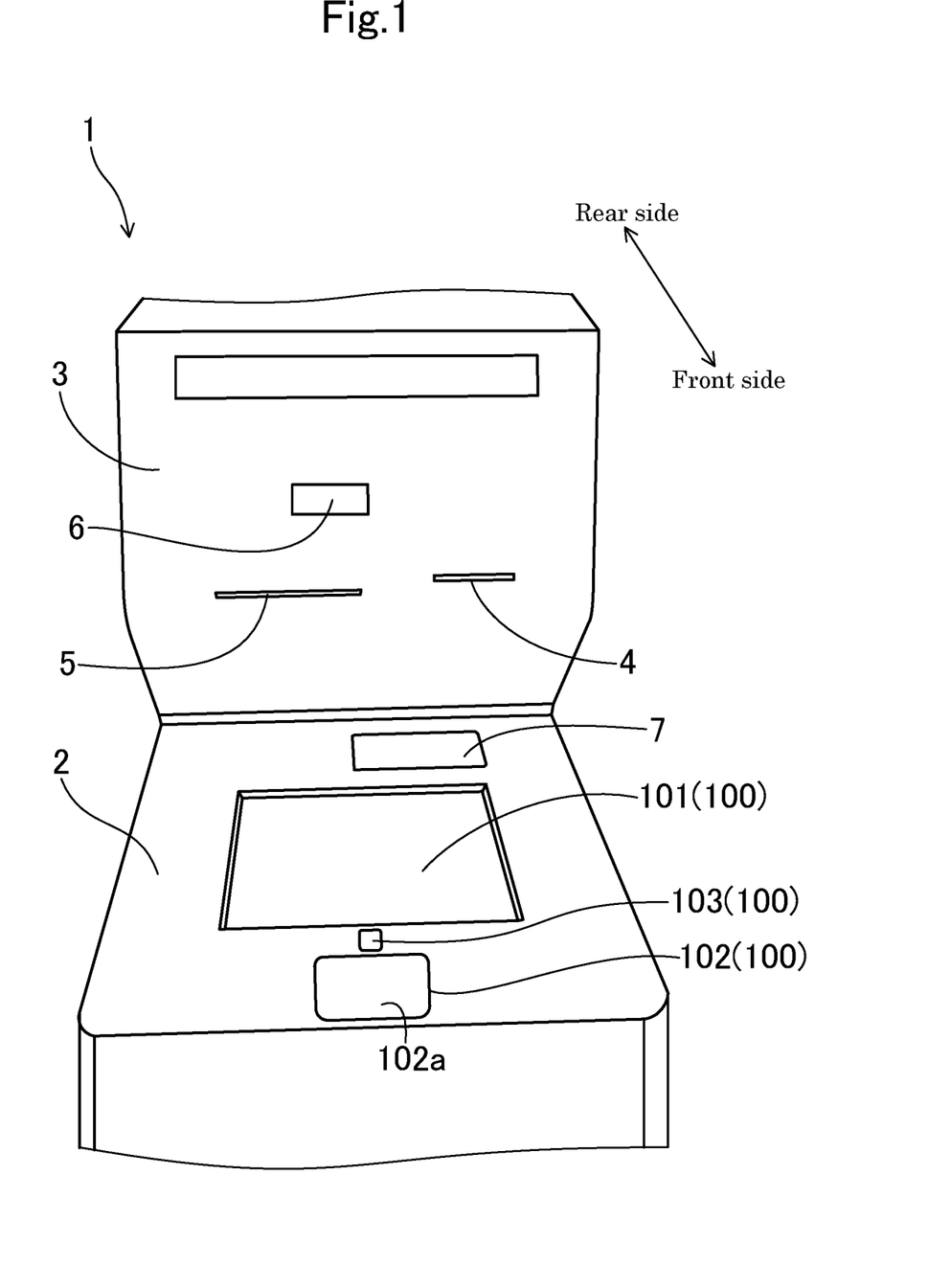
FIG. 1 is an external appearance view illustrating an ATM including a password authentication device in an embodiment.

FIG. 1 is an external appearance view illustrating an example of an electronic apparatus 1 including a password authentication device 100 in an embodiment. The electronic apparatus 1 is an automatic teller machine (hereinafter, referred to as an ATM) installed in a financial institution and the like, and conducts cash-related transactions with customers such as deposit transactions and withdrawal transactions. It is noted that the electronic apparatus 1 is not limited to the ATM and for example, may be a portable terminal, an image forming apparatus and the like.

The aforementioned ATM has a body 2 having a rectangular box shape in appearance, and a receiving unit 3 extending upward from an end part of a back side of the body 2. The receiving unit 3 is provided on the front side surface thereof with a card insertion port 4 for inserting a cash card and a passbook insertion port 5 for inserting a passbook, which are arranged side by side. Above the passbook insertion port 5, a mirror 6 is provided to reflect a person who stands behind a user (an operator). The body 2 is provided on the upper surface thereof with a depositing and dispensing port 7 for inserting and discharging banknotes for deposits and withdrawals, and a display screen 101, a touch pad 102, and a sight line detection sensor 103 constituting a part of the password authentication device 100.

[Configuration of Password Authentication Device]

Figure 2:
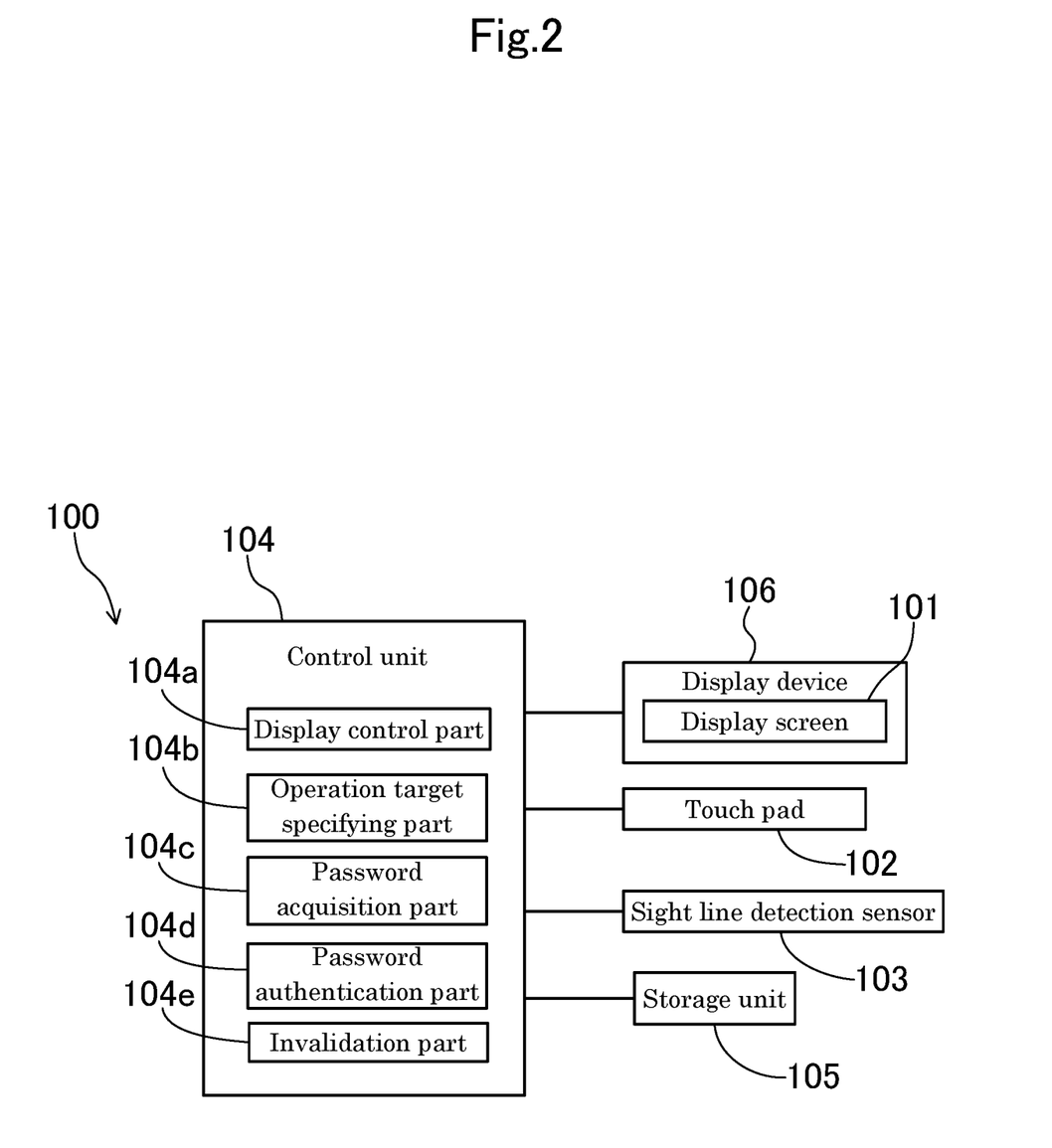
FIG. 2 is a block diagram illustrating a schematic configuration of a control system of the password authentication device.

As illustrated in FIG. 2, the password authentication device 100 has a control unit 104 and a storage unit 105, in addition to the display screen 101, the touch pad 102, and the sight line detection sensor 103.

Figure 3:
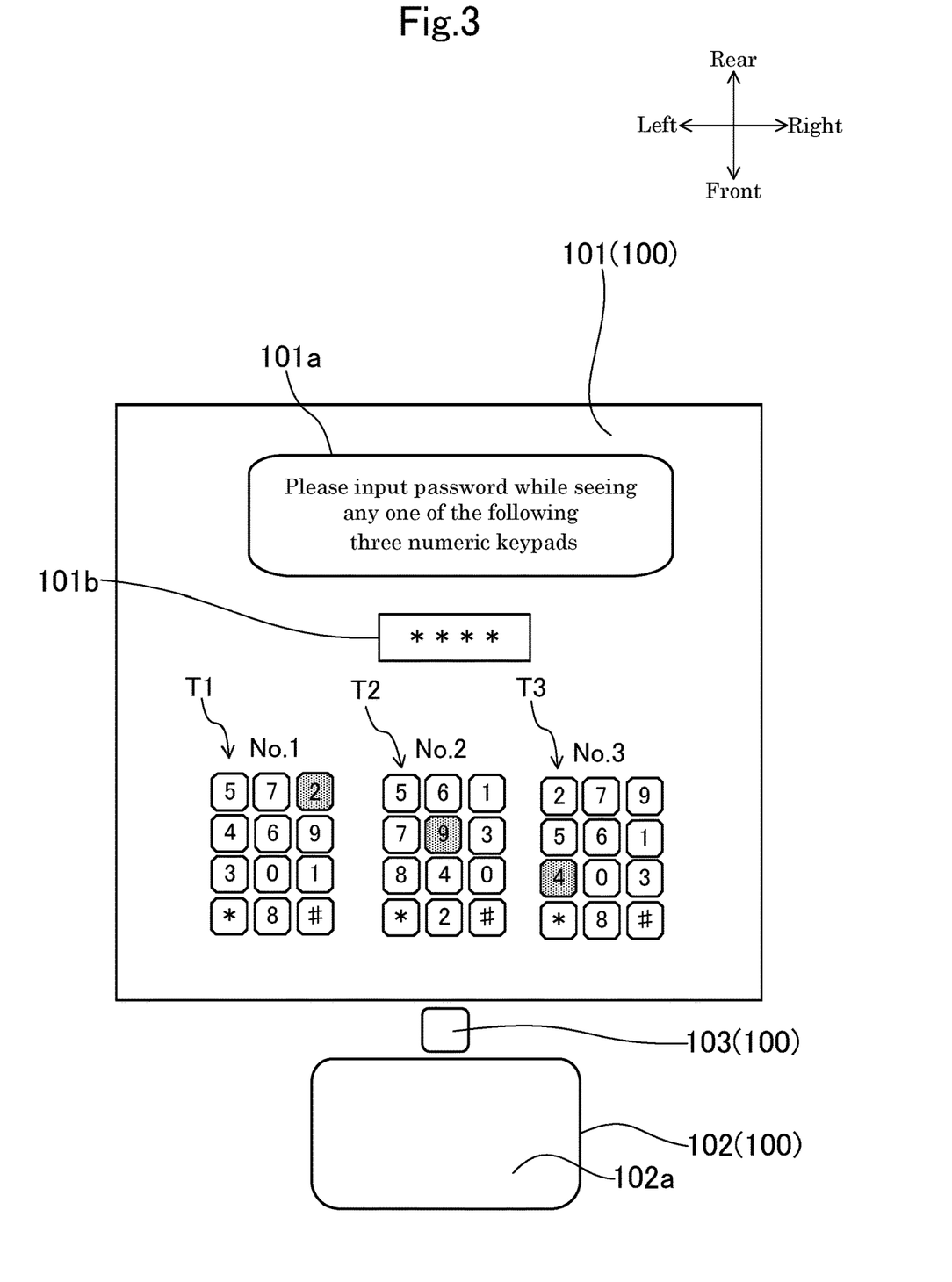
FIG. 3 is an enlarged schematic view illustrating a display screen and an operation unit.

The display screen 101 is a part of a display device 106 incorporated in the body 2. When a user is required to input a password, numeric keypads T1 to T3 are displayed on the display screen as illustrated in FIG. 3. Each of the numeric keypads T1 to T3 includes soft keys capable of inputting a plurality of numerals from "0" to "9" and symbols such as "*" and "#". Each of the numeric keypads T1 to T3 corresponds to an input key group.

On the display screen 101, a message 101a for urging the input of a password and an input box 101b are displayed in addition to the three numeric keypads. In the input box, the letter of the password is hidden to be displayed as "*". An image displayed on the display screen 101 is controlled by the control unit 104 to be described below.

The touch pad 102 has a well-known configuration including an electrostatic capacitance type touch sensor. The touch pad 102 is provided in an area (a lower side of FIG. 3) in front of the display screen 101. The touch pad 102 has a touch surface 102a exposed from an upper surface of the body 2 of the ATM.

The operation of the touch surface 102a is roughly classified into two operations of a movement operation and a pressing operation of a finger. The movement operation is an operation of moving the finger while touching the touch surface 102a to select desired soft keys. The pressing operation is an operation of confirming the selection by pressing the touch surface 102a with the finger. A user can select arbitrary soft keys on the display screen 101 by the movement operation of the finger and then input letters corresponding to the selected soft keys by performing the pressing operation. It is noted that the periphery of the touch pad 102 is preferably surrounded in a fence shape by an opaque cover. In this way, the trajectory of the finger on the touch surface 102a is hardly seen from someone else, so that it is possible to prevent the theft of a password.

The sight line detection sensor 103 is provided between the display screen 101 and the touch pad 102. The sight line detection sensor 103, for example, has an infrared camera and a microcomputer for image analysis. The infrared camera captures the right and left eyeballs of the user, and the microcomputer analyzes the captured image to compute the direction of the line of sight of the user. The sight line detection sensor 103 outputs information on the direction of the line of sight of the user computed by the microcomputer to the control unit 104.

The control unit 104 is a microcomputer including a CPU, a ROM, a RAM and the like. The control unit 104 is connected to the touch pad 102, the sight line detection sensor 103, the storage unit 105, and the display device 106 to be able to transmit and receive signals. The control unit 104 controls the display content of the display screen 101 of the display device 106 based on the operation information from the touch pad 102 and the sight line information from the sight line detection sensor 103.

Specifically, the control unit 104 has a display control part 104a, an operation target specifying part 104b, a password acquisition part 104c, a password authentication part 104d, and an invalidation part 104e.

The display control part 104a displays the three numeric keypads T1 to T3 (the input key groups) on the display screen 101 of the display device 106 as illustrated in FIG. 3 when the user is required to input a password.

The operation target specifying part 104b specifies a numeric keypad, which is located at the end of the line of sight of the user among the three numeric keypads T1 to T3, as an operation target based on the information from the sight line detection sensor 103.

The password acquisition part 104c determines that an operation performed on the touch pad 102 (the touch surface 102a) corresponds to an operation for the operation target numeric keypad (any one of the three numeric keypads T1 to T3) specified by the operation target specifying part 104b, and acquires an input password (a letter string) inputted through the touch pad 102.

The password authentication part 104d authenticates whether the input password acquired by the password acquisition part 104c matches with a registration password stored in the storage unit 105. The password authentication part 104d allows cash withdrawal at the ATM when the authentication is successful and prohibits the cash withdrawal when the authentication fails.

The invalidation part 104e invalidates the input operation through the touch pad 102 based on the information from the sight line detection sensor 103 when none of the three numeric keypads T1 to T3 is located at the end of the line of sight of the user.

The storage unit 105 is configured by a hard disk connected to the control unit 104. The storage unit 105 stores user information of each user (for example, an account number, a user ID and the like) and registration passwords associated with the user information. In the present embodiment, the registration password, for example, is configured with a four-digit number; however, the technology of the present disclosure is not limited thereto and the registration password may be a combination of alphabetic and numeric characters or a combination of various symbols.

Various processes in the aforementioned display control part 104a, operation target specifying part 104b, password acquisition part 104c, password authentication part 104d, and invalidation part 104e are performed when the CPU of the control unit 104 executes a password authentication program stored in the ROM.

[Description of Password Authentication Process]

Figure 4:
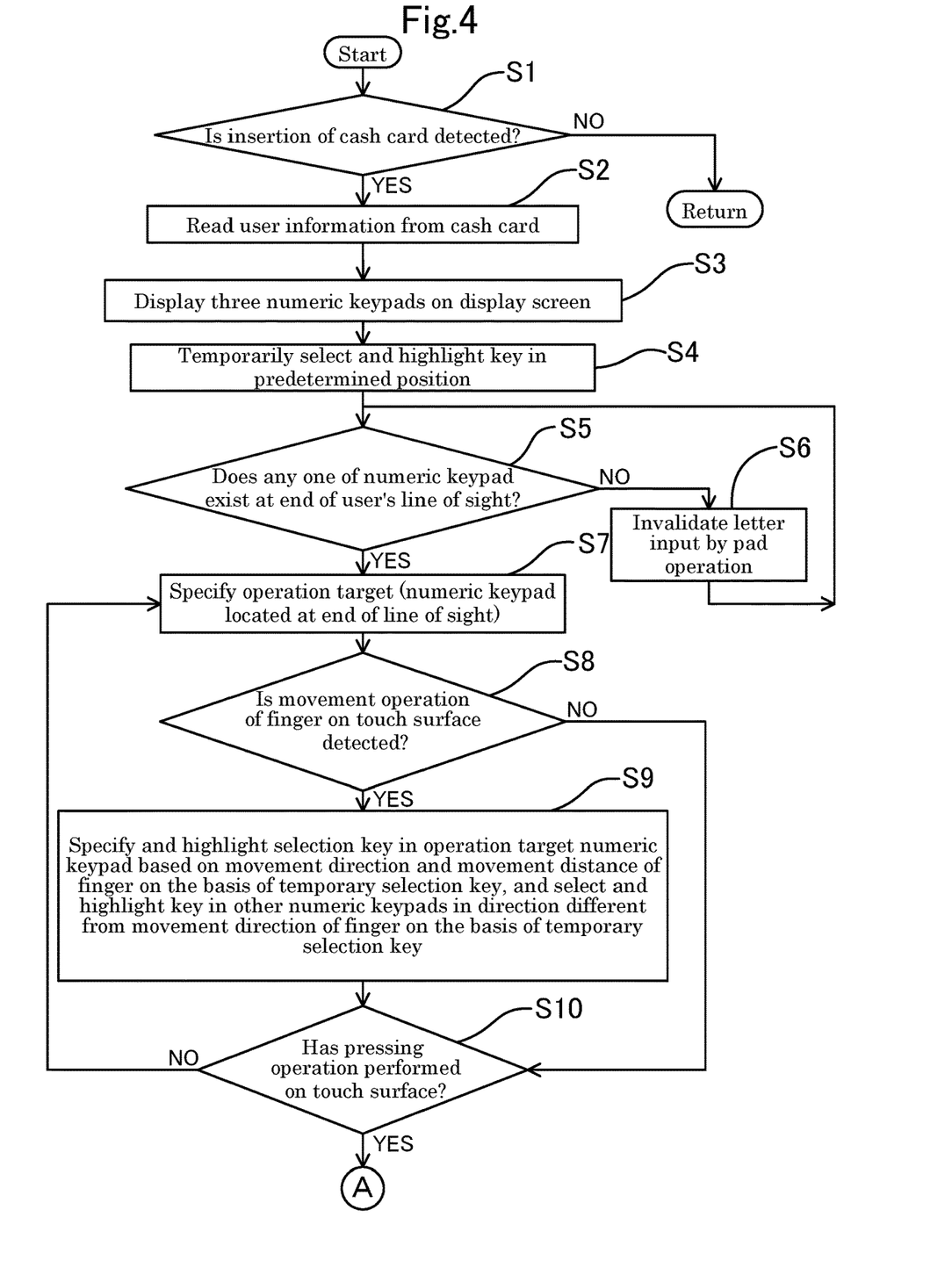
FIG. 4 is a flowchart illustrating a first half of a password authentication process performed by the password authentication device.
Figure 5:
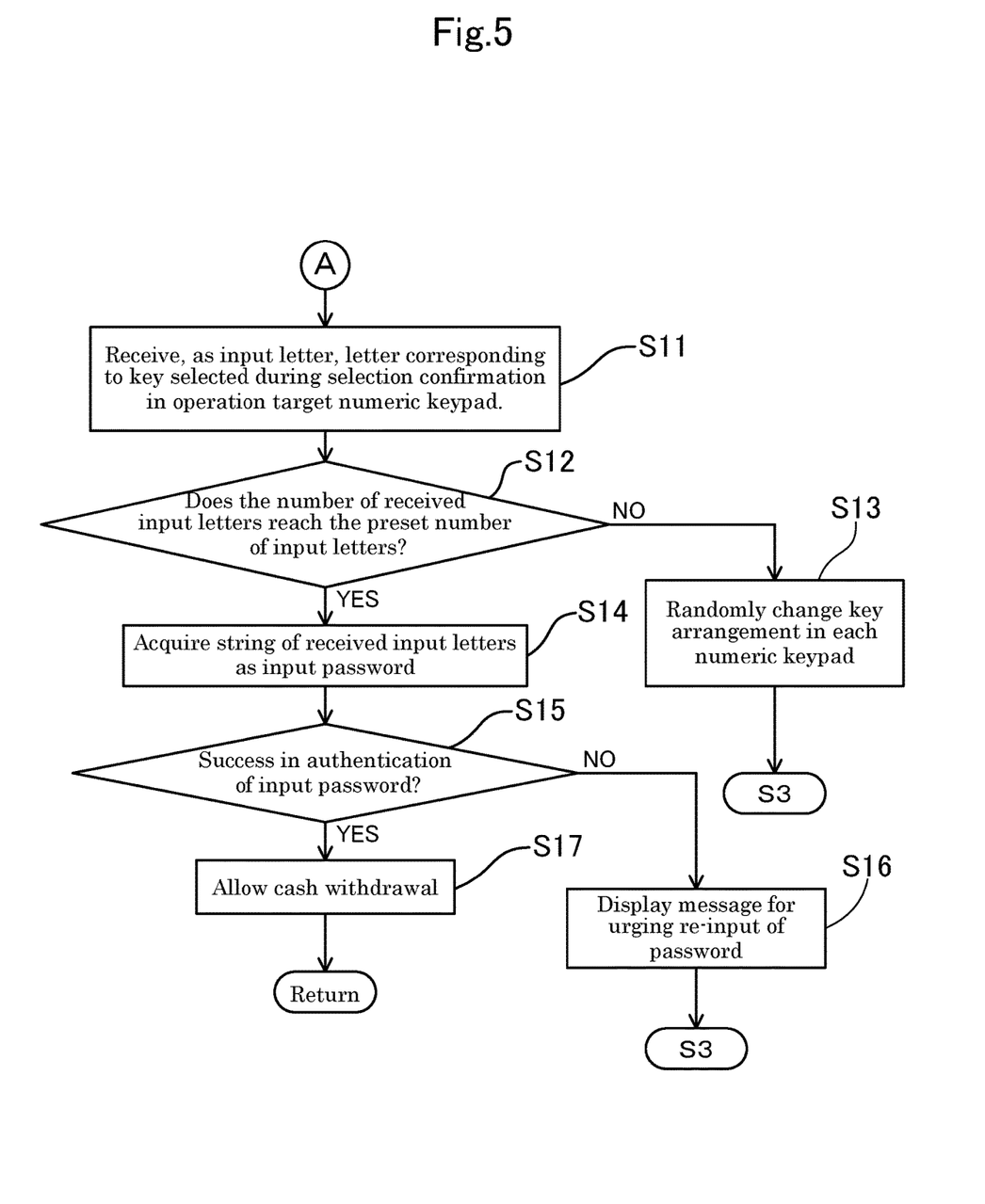
FIG. 5 is a flowchart illustrating a second half of the password authentication process performed by the password authentication device.

Next, with reference to the flowcharts of FIG. 4 and FIG. 5, a specific example of a password authentication process performed by the control unit 104 will be described.

In step S1, the control unit 104 determines whether a cash card is inserted from the card insertion port 4. When the determination is NO, the control unit 104 returns, and when the determination is YES, the control unit 104 proceeds to step S2.

In step S2, the control unit 104 reads user information (for example, an account number, a user ID and the like) stored in the cash card.

In step S3, the control unit 104 instructs the display device 106 to display the three numeric keypads T1 to T3 on the display screen 101.

In step S4, the control unit 104 temporarily selects keys in predetermined positions in each of the three numeric keypads T1 to T3, and highlights the selected keys (paints out and displays the selected keys in the present embodiment). The predetermined positions, for example, are randomly determined on the basis of a random number process. It is noted that the predetermined position, for example, may be a prescribed fixed position such as the second row and first column.

In step S5, based on information from the sight line detection sensor 103, the control unit 104 determines whether any one of the three numeric keypads T1 to T3 exists at the end of the line of sight of a user. When the determination of step S5 is NO, the control unit 104 proceeds to step S6 to prevent letters of a password from being inputted (that is, invalidates operation input from the touch pad 102) even though the touch surface 102a of the touch pad 102 is pressed, and then returns to step S5. On the other hand, when the aforementioned determination is YES, the control unit 104 proceeds to step S7.

In step S7, the control unit 104 specifies that one numeric keypad located at the end of the line of sight of the user among the three numeric keypads T1 to T3 is an operation target of the user.

In step S8, the control unit 104 determines whether a movement operation of a finger has been performed on the touch surface 102a of the touch pad 102. When the determination is NO, the control unit 104 proceeds to step S10 to be described below, and when the determination is YES, the control unit 104 proceeds to step S9.

In step S9, the control unit 104 specifies and highlights the selection keys of the user in the operation target numeric keypad (any one of the three numeric keypads T1 to T3) specified in step S7. The selection keys are specified by computing key positions, which are spaced apart by a distance corresponding to the movement distance of the finger, in the same direction as the movement direction of the finger on the touch surface 102a on the basis of the key positions temporarily selected in step S4. The selection keys are highlighted by painting out the keys; however, the technology of the present disclosure is not limited thereto and for example, the outline of the key may be displayed with a thick line.

On the other hand, in other numeric keypads other than the operation target numeric keypad (for example, the numeric keypads T2 and T3 when the operation target is the numeric keypad T1), the control unit 104 selects and highlights soft keys in a direction different from the movement direction of the finger on the touch surface 102a. Specifically, in another numeric keypad that is not the operation target, the control unit 104 specifies and highlights keys in positions spaced apart by a predetermined distance in the direction different from the movement direction of the finger on the touch surface 102a on the basis of the keys temporarily selected in step S4. It is noted that the predetermined distance may be allowed to correspond to the movement distance of the finger on the touch surface 102a.

In step S10, the control unit 104 determines whether a pressing operation (that is, a selection confirmation operation of the selection keys) has been performed on the touch surface 102a of the touch pad 102. When the determination is NO, the control unit 104 returns to step S7, and when the determination is YES, the control unit 104 proceeds to step S11 (see FIG. 5).

In step S11, the control unit 104 receives, as input letters, letters corresponding to the selection keys selected during the pressing operation (the selection confirmation operation) of step S10 in the operation target numeric keypad specified in step S7.

In step S12, the control unit 104 determines whether the number of already received input letters reaches the preset number of input letters (the number of letters of a registration password). When the determination is NO, the control unit 104 proceeds to step S13, randomly changes the key arrangement of each of the numeric keypads T1 to T3, and then returns to step S3. On the other hand, when the determination of step S12 is YES, the control unit 104 proceeds to step S14 to acquire the string of the already received input letters as an input password.

In step S15, the control unit 104 determines whether the input password acquired in step S12 matches with a registration password corresponding to the user information read in step S2. When the determination is NO, the control unit 104 determines that the password acquisition has failed, proceeds to step S16 to display a message for urging the re-input of a password on the display screen 101, and then returns to step S3. On the other hand, when the determination is YES, the control unit 104 proceeds to step S17 to allow cash withdrawal by opening the shutter of the depositing and dispensing port 7, and then returns.

[Description of Password Input Operation]

Figure 6A:
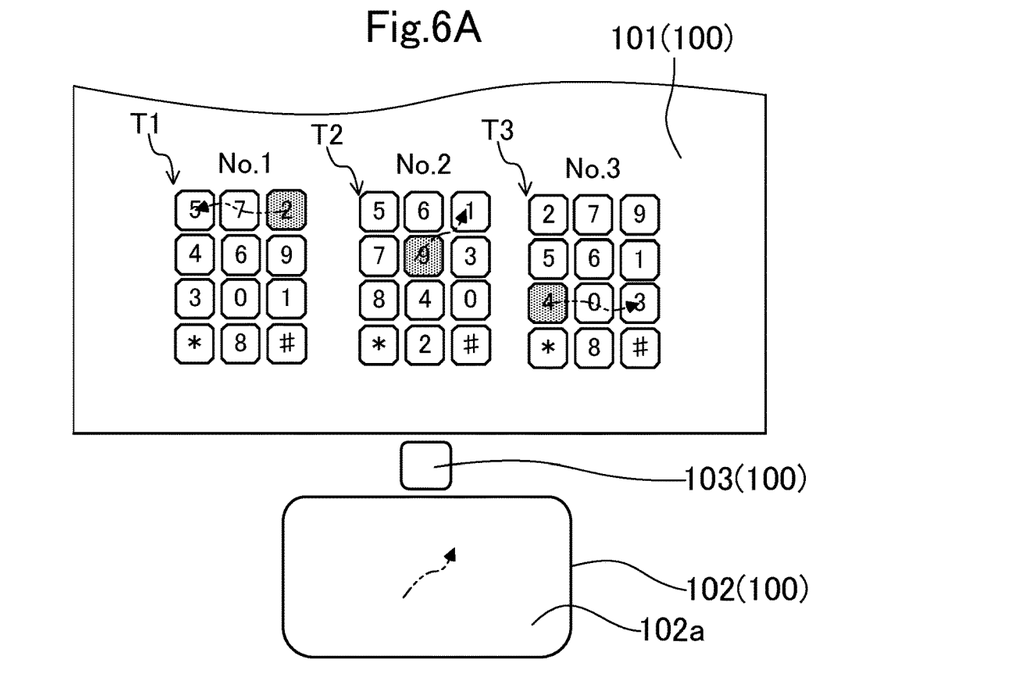
FIG. 6A is an explanation view for explaining a password input operation.
Figure 6B:
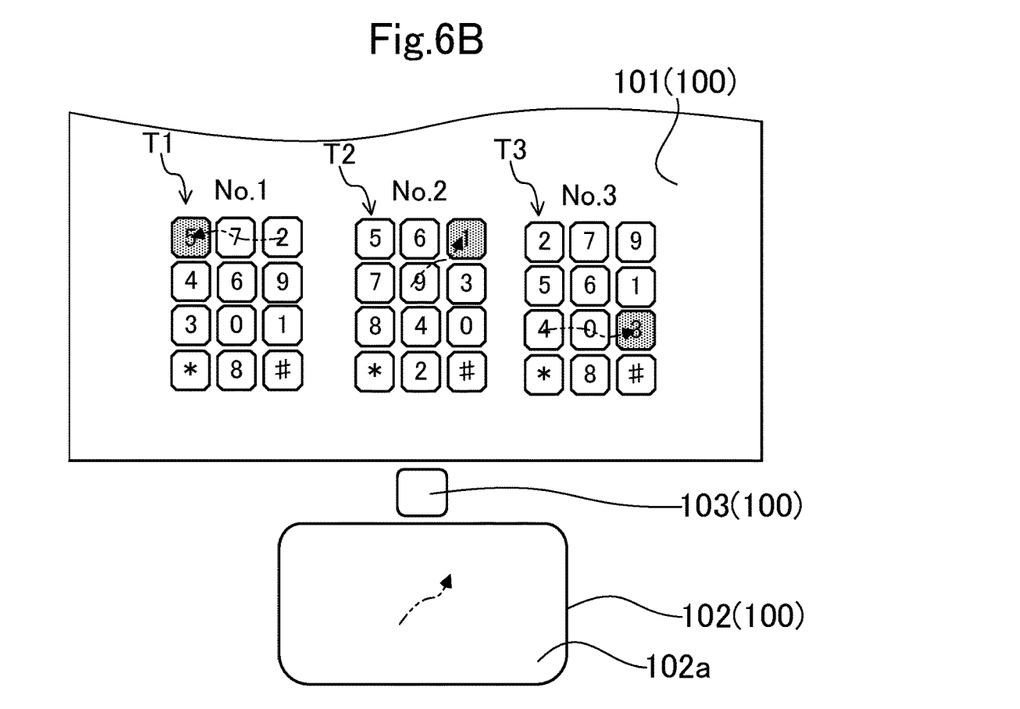
FIG. 6B is an explanation view for explaining the password input operation.
Figure 6C:
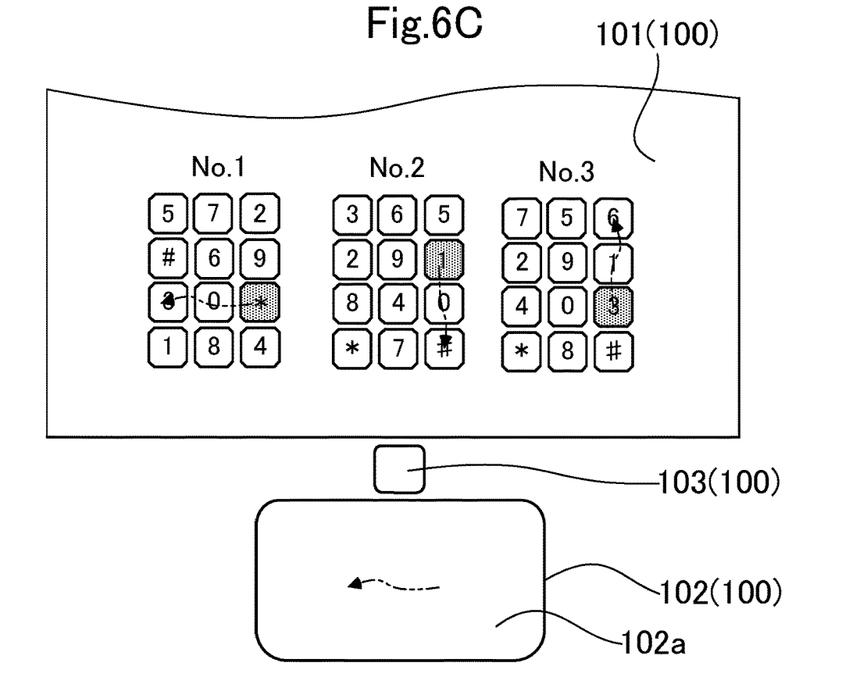
FIG. 6C is an explanation view for explaining the password input operation.
Figure 6D:
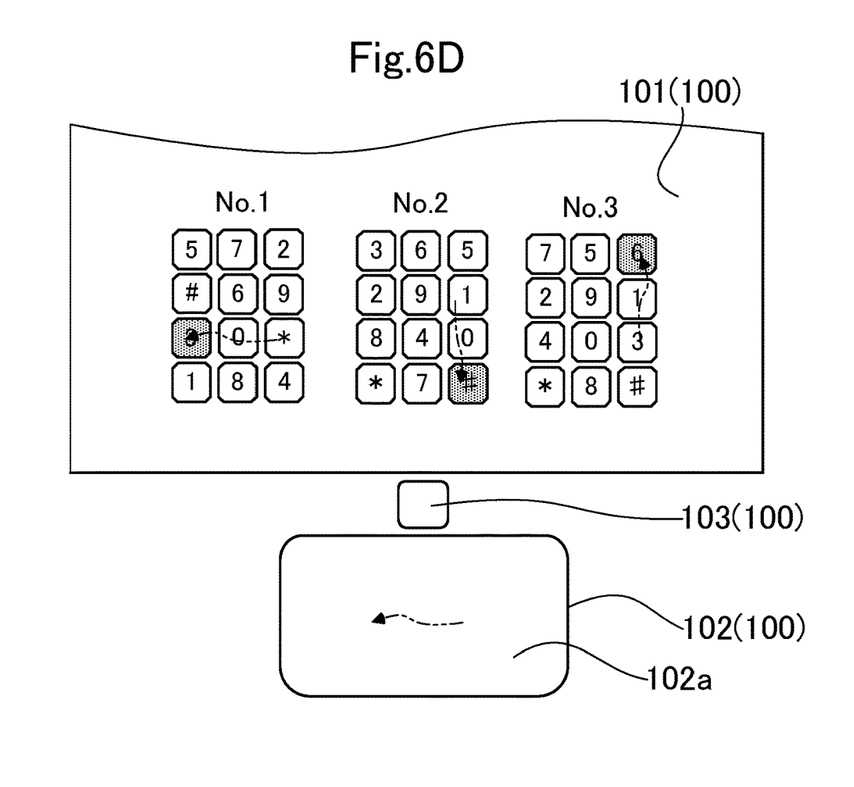
FIG. 6D is an explanation view for explaining the password input operation.

An example of the password input operation in the ATM configured as above will be described based on FIG. 6A to FIG. 6D. FIG. 6A and FIG. 6B illustrate a procedure in which a user inputs the first letter (an initial letter) of a password while seeing the central numeric keypad T2, and FIG. 6C and FIG. 6D illustrate a procedure in which the user inputs the second letter of the password while seeing the left numeric keypad T1. In each drawing, a two-dot chain line arrow shown in the touch surface 102a indicates a movement path of a finger, and a two-dot chain line arrow shown in each of the numeric keypads T1 to T3 indicates a movement path of a selection key (a key which is highlighted).

Firstly, when the user inserts a cash card into the card insertion port 4, the three numeric keypads T1 to T3 are displayed as illustrated in FIG. 6A. In each of the numeric keypads T1 to T3, numeric keys and symbol keys (an example of soft keys) are arranged randomly (irregularly), not in numerical order. Furthermore, in each of the numeric keypads T1 to T3, keys in predetermined positions are temporarily selected and highlighted (steps S1 to S4).

In such a state, it is assumed that the user moves his/her finger to the upper right side of the drawing (see the two dot chain line arrow of the touch surface 102a) on the touch surface 102a of the touch pad 102 with his/her line of sight directed to the central numeric keypad T2. In such a case, as illustrated in FIG. 6B, in the operation target numeric keypad T2 located at the end of the line of sight of the user, the numeric key "1" in a position corresponding to the movement direction and movement distance of the finger is specified and highlighted as a selection key by the user on the basis of the numeric key "9" temporarily selected (steps S7 to S9). On the other hand, in the left and right numeric keypads T1 and T3 that are not the operation target, the numeric keys "5" and "3" in directions different from the movement direction of the finger are selected and highlighted on the basis of the numeric keys "2" and "4" temporarily selected (steps S7 to S9). In such a state, the user presses the touch surface 102a of the touch pad 102, so that it is possible to input the numeric key "1", which is selected in the central numeric keypad T2 serving as the operation target, as the first letter of the password (steps S10 and S11).

When the input of the first letter is completed, the key arrangement of each of the numeric keypads T1 to T3 on the display screen 101 is randomly changed to a key arrangement different from that at the time of inputting the first letter (step S13), and key positions temporarily selected (highlighted) in each of the numeric keypads T1 to T3 are also randomly changed (step S4), as illustrated in FIG. 6C.

In such a state, it is assumed that the user moves his/her finger to the left side (see the two dot chain line arrow of the touch surface 102a of FIG. 6C) on the touch surface 102a of the touch pad 102 with his/her line of sight directed to the left numeric keypad T1. In such a case, in the operation target numeric keypad T1 located at the end of the line of sight of the user, the numeric key "3" in a position corresponding to the movement direction and movement distance of the finger is specified and highlighted as a selection key by the user on the basis of the symbol key "*" temporarily selected (steps S7 to S9). On the other hand, in the central and right numeric keypads T2 and T3 that are not the operation target, the symbol key "#" and the numeric key "6" in directions (unrelated directions) different from the movement direction of the finger are selected and highlighted on the basis of the numeric key "1" and the numeric key "3" temporarily selected (steps S7 to S9). In such a state, the user presses the touch surface 102a of the touch pad 102, so that it is possible to input the numeric key "3", which is selected in the left numeric keypad T1 serving as the operation target, as the second letter of the password. It is noted that letters after the third letter may also be inputted in a similar procedure.

[Operation and Effect]

As described above, in the present embodiment, when a user is required to input a password, the control unit 104 displays the three numeric keypads T1 to T3 on the display screen 101. Furthermore, the control unit 104 is configured to specify a numeric keypad, which is located at the end of the line of sight of the user specified by the sight line detection sensor 103, as an operation target numeric keypad, and to acquire a password inputted through the touch surface 102a of the touch pad 102.

Consequently, even though someone else around a user (an operator) can steal a glance at the display screen 101, the someone else is not able to determine an operation target numeric keypad, on which the user performs the input operation (the movement operation and the pressing operation of a finger) among the three numeric keypads T1 to T3. Thus, it is possible to significantly reduce the leakage risk of a password, compared to the related password authentication device 100 that displays only one numeric keypad on the display screen 101.

Furthermore, when the movement operation of the finger is performed on the touch surface 102a of the touch pad 102, the control unit 104 is configured to specify and highlight a selection key by the user based on the movement direction and movement distance of the finger on the touch surface 102a with respect to a numeric keypad specified as an operation target of the user (a numeric keypad located at the end of the line of sight of the user and any one of the three numeric keypads T1 to T3) on the basis of a predetermined soft key temporarily selected in advance, and to select and highlight a soft key in a direction different from the movement direction of the finger on the touch surface 102a with respect to the other numeric keypads.

As described above, the movement directions of the selection keys (the highlighted keys) in the numeric keypads T1 to T3 of the display screen 101 are caused to be different from one another, so that the movement path of the finger of the user can be prevented from being inferred based on the movement paths of the selection keys on the display screen 101. Thus, it is possible to further reduce the leakage risk of a password.

Furthermore, in the present embodiment, the control unit 104 is configured to invalidate password input through the touch pad 102 when none of the numeric keypads T1 to T3 at the end of the direction of the line of sight is detected by the sight line detection sensor 103.

According to this, the password input is invalidated, so that the user more carefully turns his/her eyes toward any one of the numeric keypads T1 to T3. Accordingly, it is possible to improve the detection accuracy of the direction of the line of sight of the user by the sight line detection sensor 103.

Furthermore, in the present embodiment, the control unit 104 is configured to change the key arrangement of the soft keys of each of the numeric keypads T1 to T3 displayed on the display screen 101 and change a temporary selection key (a key used as a start reference of a selection operation) in each of the numeric keypads T1 to T3 whenever a single letter of a password is inputted via the touch pad 102.

According to this, it becomes much harder for someone else to sense a password, compared to the case where the key arrangement and the temporary selection key of each of the numeric keypads T1 to T3 displayed on the display screen 101 are fixed. Thus, it is possible to reduce the leakage risk of a password as much as possible.

Embodiment 2

Figure 7:
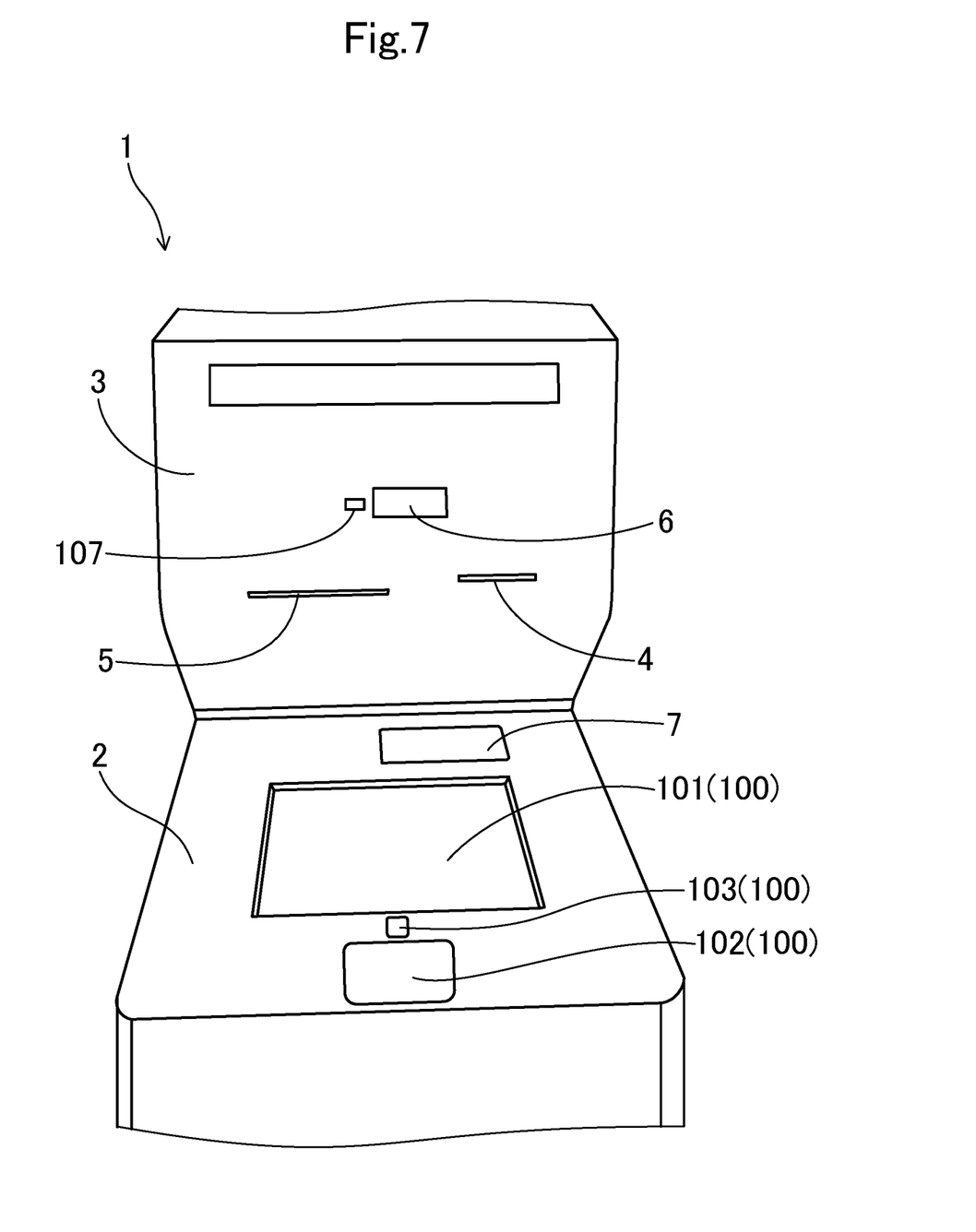
FIG. 7 is a view corresponding to FIG. 1, which illustrates an embodiment 2.
Figure 8:
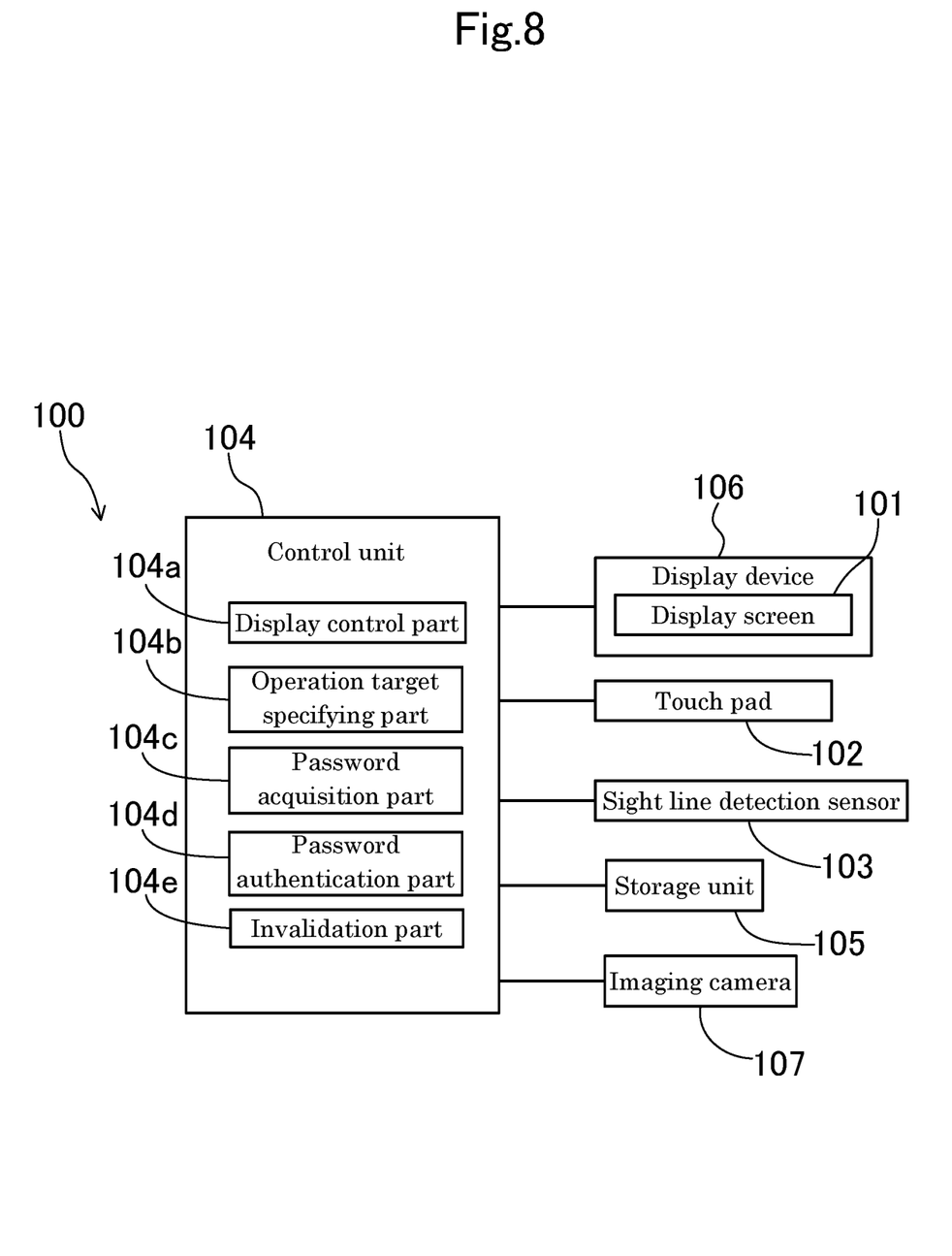
FIG. 8 is a view corresponding to FIG. 2, which illustrates the embodiment 2.

FIG. 7 and FIG. 8 are views corresponding to FIG. 1 and FIG. 2 in an embodiment 2. This embodiment is different from the embodiment 1 in that an imaging camera 107 (an example of a person detection unit), which captures a person around a user (an operator), is included as an element of the password authentication device 100. It is noted that since the other configurations are similar to those of the embodiment 1, except for this point, a detailed description thereof will be omitted.

Figure 9:
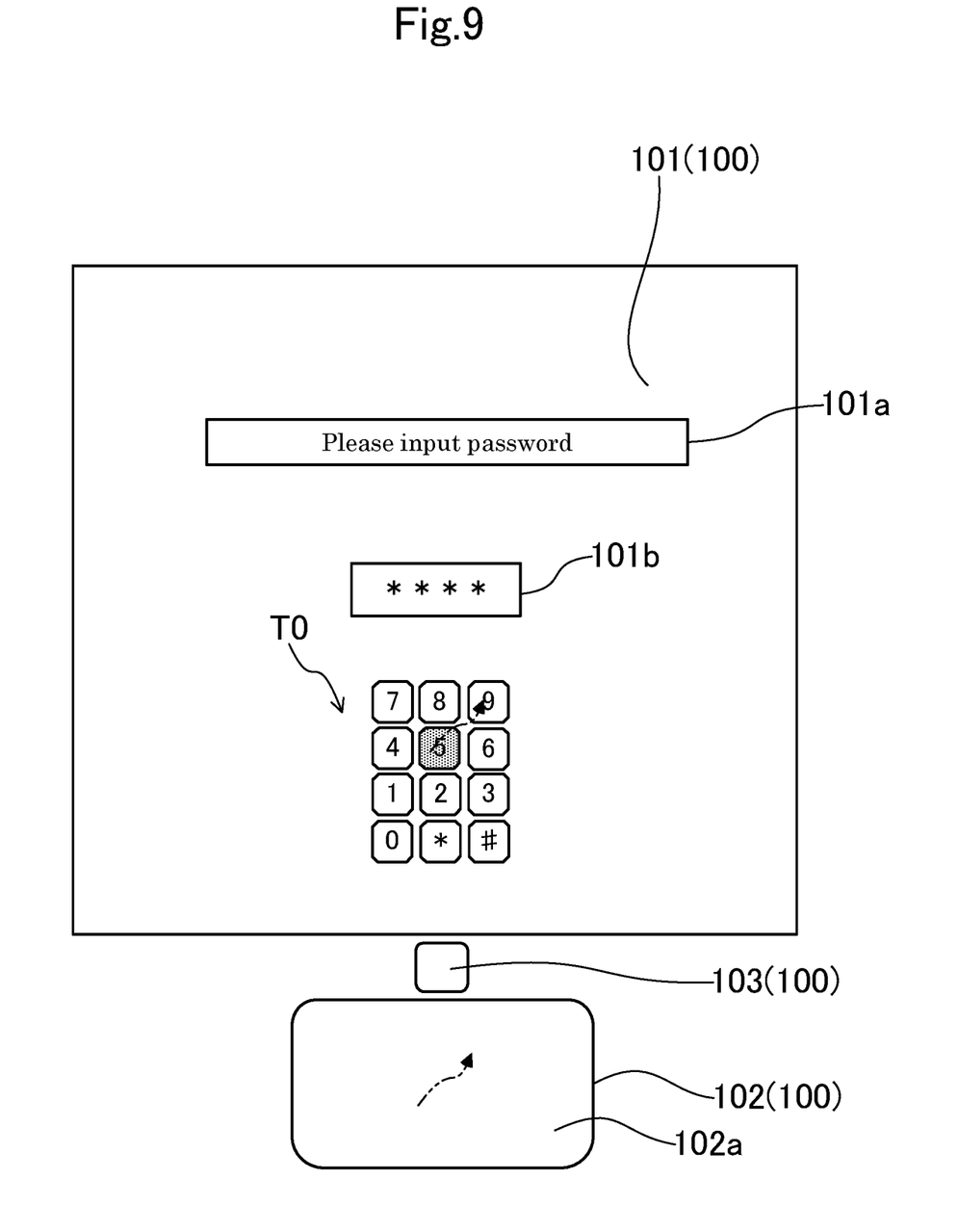
FIG. 9 is a view corresponding to FIG. 3, which illustrates the embodiment 2.

The imaging camera 107 is provided on the left side of the mirror 6 in the receiving unit 3 of the ATM. The imaging camera 107 transmits a captured image to the control unit 104 as digital data. Based on the image data from the imaging camera 107, the control unit 104 determines whether a person is present around the user (for example, within a radius of 1 m to 2 m). When it is determined that a person is present around the user based on the image data from the imaging camera 107, the control unit 104 displays the three numeric keypads T1 to T3 on the display screen 101 and requests the input of a password (performs the processes of steps S3 to S13), similarly to the embodiment 1. On the other hand, when it is determined that no person is present, the control unit 104 displays only one numeric keypad T0 and requests the input of a password, as illustrated in FIG. 9.

When it is determined that no person is present around the user, the control unit 104 assumes an operation in the touch pad 102 as an operation for the one numeric keypad T0 displayed on the display screen 101 and acquires a password inputted through the touch pad 102.

According to the password authentication device 100 of the present embodiment, when no person is present, since only one numeric keypad T0 is displayed on the display screen 101, the user can input a password by operating the touch pad 102 while seeing only the numeric keypad T0. Thus, a feeling of annoyance during the password input operation is reduced, compared to the case where the three numeric keypads T1 to T3 are displayed on the display screen 101. It is noted that the keys of the numeric keypad T0 are preferably arranged regularly in numerical order from the point of view of reducing a feeling of annoyance of a user. Furthermore, when the numeric keypad T0 is displayed, it is preferable that any control such as changing a key arrangement is not performed whenever a single letter of a password is inputted.

Other Embodiments

In the aforementioned each embodiment, the control unit 104 moves a selection key in a direction different from the movement direction of the finger on the touch surface 102a in the other numeric keypads, other than the operation target, among the three numeric keypads T1 to T3 displayed on the display screen 101; however, the technology of the present disclosure is not limited thereto. Also in the other numeric keypads, similarly to the numeric keypad that is the operation target, keys in positions corresponding to the movement direction and movement distance of the finger are highlighted as selection keys on the basis of temporary selection keys. In this way, also in the numeric keypads T1 to T3, the movement trajectory of the selection keys are the same, even though someone else steals a glance at both the movement of the finger on the display screen 101 and the movement of the finger on the touch surface 102a, it becomes harder for the someone else to specify an operation target numeric keypad of the user among the three numeric keypads T1 to T3. Thus, it is possible to reduce the leakage risk of a password as much as possible.

In the aforementioned each embodiment, the touch pad 102 is employed as an input operation unit; however, the technology of the present disclosure is not limited thereto and a cursor key, a joystick and the like may also be employed. Furthermore, the input operation unit may also be provided on the display screen. In such a case, preferably, the display screen is configured with a touch panel and the like and the input operation unit is arranged at a position away from the numeric keypads T1 to T3 as far as possible.

In the aforementioned each embodiment, the three numeric keypads T1 to T3 are displayed on the display screen 101 as an example; however, the technology of the present disclosure is not limited thereto and the number of numeric keypads may be two, or four or more. Furthermore, the numeric keypad capable of inputting numerals from 0 to 9 is employed as an example of the input key group; however, the technology of the present disclosure is not limited thereto. That is, the input key group may a keyboard and the like capable of inputting the alphabet.

Furthermore, in the aforementioned embodiment 2, the imaging camera 107 is used as the person detection unit that detects a person around a user; however, the technology of the present disclosure is not limited thereto and for example, a person sensing sensor may also be used.

What is claimed is:

1. A password authentication device comprising:
   a display device having a display screen;
   a display control unit configured to cause a plurality of input key groups including a plurality of soft keys for inputting a password for user authentication to be displayed on the display screen;
   an input operation unit provided at a different position from the plurality of input key groups, and operated by a user to select a soft key on the display screen so as to enable input of a password;
   a sight line detection sensor configured to detect a direction of a line of sight of the user who operates the input operation unit;
   an operation target specifying part configured to specify an input key group located at an end of the line of sight of the user among the plurality of input key groups, based on the direction of the line of sight detected by the sight line detection sensor;
   a password acquisition part configured to assume an operation in the input operation unit as an operation for the input key group specified by the operation target specifying part and to acquire a password inputted through the input operation unit; and
   a password authentication part configured to authenticate the password acquired by the password acquisition part,
   wherein the input operation unit has a touch surface touched by a finger and is configured to be able to select a desired soft key by moving the finger on the touch surface, and
   the display control unit is configured to temporarily select and highlight one predetermined soft key in each of the input key groups when the plurality of input key groups are displayed on the display screen, to, when a movement operation of the finger is performed on the touch surface, specify and highlight, as a selection key by the user, a soft key spaced apart by a distance equivalent to a movement distance of the finger in a direction identical to a movement direction of the finger on the touch surface on the basis of the temporarily selected predetermined soft key with respect to the input key group specified by the operation target specifying part, and to select and highlight a soft key spaced apart by a distance equivalent to the movement distance of the finger in a direction different from the movement direction of the finger on the touch surface on the basis of the temporarily selected predetermined soft key with respect to the other input key groups.

2. The password authentication device of claim 1, wherein the password for user authentication includes a plurality of letters, and
   the display control unit is configured to change a key arrangement of the soft keys of each of the input key groups displayed on the display screen and to change the predetermined soft key temporarily selected in advance whenever a single letter of the password is inputted via the input operation unit.

3. The password authentication device of claim 1, further comprising:
   an invalidation part configured to invalidate input of the password through the input operation unit when none of the input key groups is present at an end of the direction of the line of sight detected by the sight line detection sensor.

4. The password authentication device of claim 1, comprising:
   a person detection unit configured to detect whether a person is present around the user who is using the password authentication device,
   wherein, when no person is detected by the person detection unit, the display control unit displays only one input key group without performing a process of displaying the plurality of input key groups on the display screen, and the password acquisition part assumes an operation in the input operation unit as an operation for the one input key group displayed on the display screen and acquires a password inputted through the input operation unit.

5. An electronic apparatus comprising the password authentication device of claim 1.

* * * * *